United States Patent [19]

Shimanuki et al.

[11] Patent Number: 4,807,133
[45] Date of Patent: Feb. 21, 1989

[54] ANTI-SKID CONTROL SYSTEM FOR MOTOR VEHICLES

[75] Inventors: Haruki Shimanuki, Kasukabe; Hideo Akima, Yokohama; Akira Hoashi, Kawasaki, all of Japan

[73] Assignees: Akebono Brake Industry Co., Ltd.; Fujitsu Limited, both of Japan

[21] Appl. No.: 47,613

[22] Filed: May 8, 1987

[30] Foreign Application Priority Data

May 9, 1986 [JP] Japan .................................. 61-104734

[51] Int. Cl.$^4$ .............................................. B60T 8/58
[52] U.S. Cl. ................................ 364/426.02; 303/105; 303/95
[58] Field of Search ................ 364/426, 565; 180/197; 303/94–96, 102, 103, 109

[56] References Cited

U.S. PATENT DOCUMENTS

| 4,395,761 | 7/1983 | Sato et al. | 364/426 |
| 4,660,896 | 4/1987 | Matsuda | 364/426 |
| 4,741,580 | 5/1988 | Matsubara et al. | 303/109 |

Primary Examiner—Gary Chin

[57] ABSTRACT

In an anti-skid control system for motor vehicle, there is provided means adapted, when the motor vehicle is running on a rough road, to detect that the road on which the motor vehicle is now running is a rough one, thereby preventing reduction of brake hydraulic pressure from being started early.

3 Claims, 4 Drawing Sheets

ANTI-SKID CONTROL SYSTEM FOR MOTOR VEHICLES

BACKGROUND OF THE INVENTION

1. Field of the Invention:

This invention relates to a novel and improved anti-skid control system for motor vehicles, which is operative to prevent the wheels of the motor vehicle from skidding during braking operation of the motor vehicle.

2. Description of the Prior Art:

Generally, with an anti-skid control system for motor vehicles, anti-skid control is effected by means of microcomputers such that hold valves and decay valves comprising electromagentic valves are opened and closed on the basis of electrical signals representing wheel speeds sensed by wheel speed sensors, thereby increasing, holding or reducing the brake hydraulic pressure, for the purpose of securing improved steering performance and running stability of the motor vehicle, while at the same time shortening the braking distance.

FIG. 1 of the accompanying drawings illustrates, by way of example, manners in which wheel speed Vw, wheel acceleration and deceleration $+\dot{V}w$, $-\dot{V}w$ and brake hydraulic pressure Pw are varied during the operation of the conventional anti-skid control system, together with hold signal HS and decay signal DS for opening and closing hold valves and decay valves.

When the brake equipment of the motor vehicle is not being operated while the motor vehicle is running, the hold valves remain open while the decay valves remain closed, and the brake hydraulic pressure Pw is not increased; and when the brake equipment is being operated, the brake hydraulic pressure Pw is increased at time t1 so that the wheel speed Vw is decreased. A reference wheel speed Vt is set up which is lower by a predetermined amount ΔV than the wheel speed Vw and follows the latter with such a speed difference. More specifically, reference wheel speed Vt is set up so that the deceleration (negative acceleration) $-\dot{V}w$ of the wheel reaches a predetermined threshold level, say $-1G$ at time t2, the reference wheel speed Vt is thereafter made to linearly decrease with a deceleration gradient of $-1G$. At time t3 when the deceleration $-\dot{V}w$ of the wheel reaches a predetermined maximum value -Gmax, the hold signal HS is interrupted so that the hold valves are closed, thus holding the brake hydraulic pressure Pw.

Because of the brake hydraulic pressure Pw being held, the wheel speed Vw is further decreased. At time t4, the wheel speed Vw and the reference wheel speed Vt become equal to each other, and the decay signal DS is generated, by which the decay valves are opened so that reduction of the brake hydraulic pressure Pw is started. As a result of this reduction of the brake hydraulic pressure Pw, the wheel speed Vw is changed from deceleration to acceleration, at time t5 when a low peak VL of the wheel speed Vw occurs. Either at the time t5 or at time t6 when the wheel speed Vw is increased up to the level of a speed Vb that is higher than the low peak speed VL by 15% of the difference A between the wheel speed Va occurring at the time t4 when the reduction of the brake hydraulic pressure is started (Vb=VL+0.15A) and the low-peak speed VL, the decay signal DS is interrupted, and as a result the decay valves are closed so that the reduction of the brake hydraulic pressure Pw is stopped and thus the brake hydraulic pressure is held. The wheel speed Vw is further increased and a high peak VH thereof is reached at time t7; thereupon, the brake hydraulic pressure Pw is again increased. In this case, the buildup of the brake hydraulic pressure Pw is effected in such a manner that the brake hydraulic pressure Pw is alternately increased and held in succession by the fact that the hold signal is turned on and off mincingly so that the brake hydraulic pressure Pw is caused to gradually build up. In this way, the wheel speed Vw is decreased, and at time t8, the mode for reduction of the brake hydraulic pressure occurs again. The brake hydraulic pressure increasing, holding and reducing modes are effected in combination as mentioned above, and thus the wheel speed Vw can be controlled so that the vehicle speed can be decreased, while the wheels of the motor vehicle are prevented from being locked.

When the motor vehicle is running on a rough road, it frequently happens that the wheels thereof are caused to float in the air. In such a state, if the brake equipment of the vehicle is operated through the aforementioned anti-skid control operation, then the wheels will tend to be subjected to early-locking, and thus when the wheels are caused to land on the road again while being locked, changes in the wheel speeds turn out to be different from those which occur when the vehicle is running on a normal road. More specifically, when the vehicle is running on a rough road, the cycle of the anti-skid control turns out to be faster than when the vehicle is running on a normal road, and the amplitude of the wheel speed Vw also becomes larger. Disadvantageously, therefore, in the case where even when the vehicle is running on a rough road the reference wheel speed Vt from which a point of time when reduction of the brake hydraulic pressure is to be started, is set up on the basis of a standard similar to that that is used when the vehicle is running on a normal road, an pressure reduction starting point will be reached soon after buildup of the brake hydraulic pressure was started at a high peak of the wheel speed, so that the brake hydraulic pressure will be prevented from building up, as a result of which the braking distance will be increased.

SUMMARY OF THE INVENTION

Accordingly, it is an object of the present invention to provide an anti-skid control system for motor vehicles, which is so designed that when the motor vehicle is running on a rough road, the brake hydraulic pressure is prevented from starting early reduction, by detecting that the motor vehicle is running on a rough road.

Briefly stated, according to the present invention, there is provided an anti-skid control system for motor vehicles, wherein a reference wheel speed is set up which is lower by a predetermined amount ΔV than wheel speed decelerated through buildup of brake hydraulic pressure and follows the wheel speed with a speed difference corresponding to said amount ΔV, said reference wheel speed being decelerated, from a point of time when the deceleration of said wheel speed reaches a predetermined deceleration level onward, with a predetermined deceleration gradient to hold said predetermined deceleration level; and at a point of time when said reference wheel speed becomes equal to said wheel speed, reduction of the brake hydraulic pressure is started so that said wheel speed is changed from deceleration to acceleration, comprising:

a first means for measuring a first time period which is the time period from a first point of time when brake operation is to be started or high peak of the wheel speed occurs;

a second means for measuring a second time period which is the time period from a third point of time when low peak of the wheel speed occurs within said first time period to said second point of time when said subsequent high peak of the wheel speed occurs;

a third means for measuring a second speed difference which is the difference between the wheel speed at said second point of time and the wheel speed at said third point of time;

a fourth means for making judgment as to whether said first and second time periods occur within a first and a second preset time period respectively;

a fifth means for making judgment as to whether said second speed difference is greater than a preset speed difference; and a sixth means adapted, when the results of said judgments are positive; to change said first speed difference to a greater preset speed difference, thereby preventing reduction of the brake hydraulic pressure from being started early.

Other objects, features and advantages of the present invention will become apparent from the ensuing description taken in conjunction with the accompanying drawings.

DESCRIPTION OF THE PREFERRED EMBODIMENTS

Figure 1:
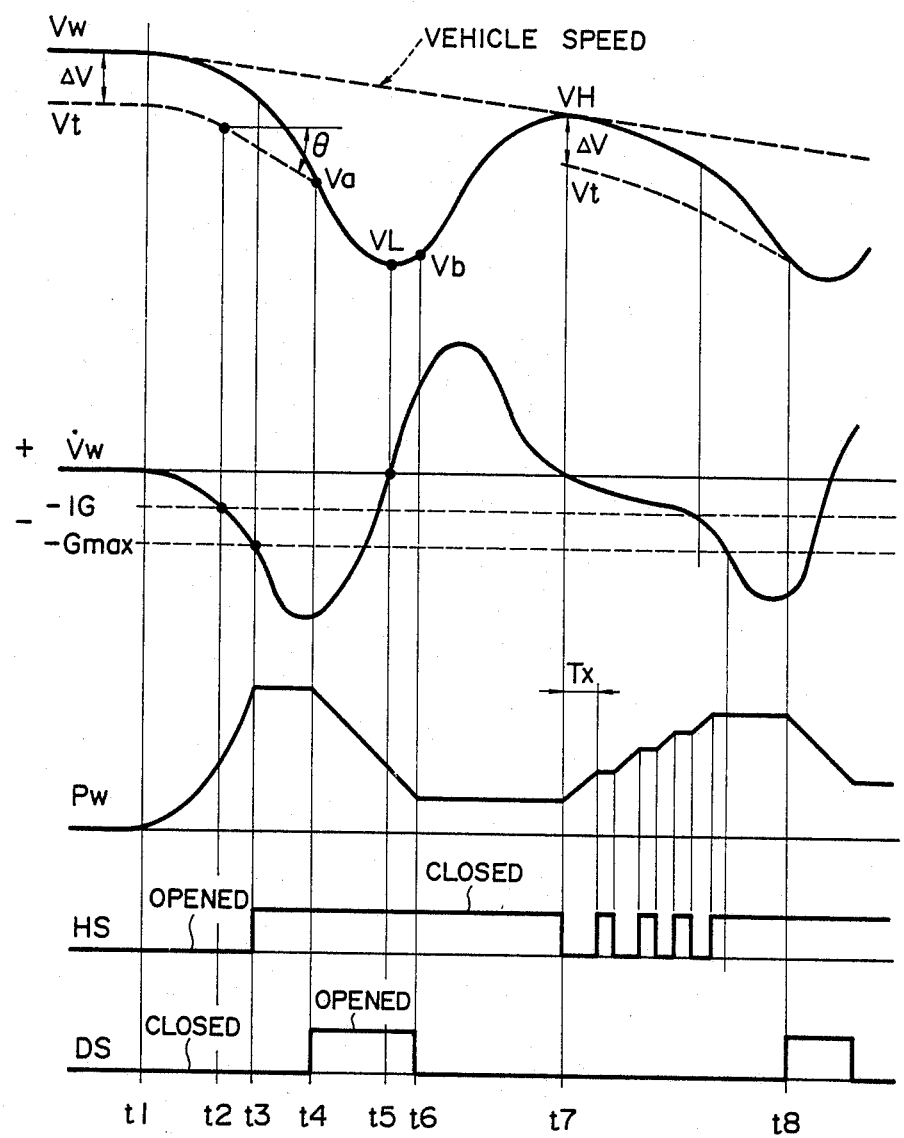
FIG. 1 is a view illustrating manners in which the conventional anti-skid control procedures are carried out.
Figure 2:
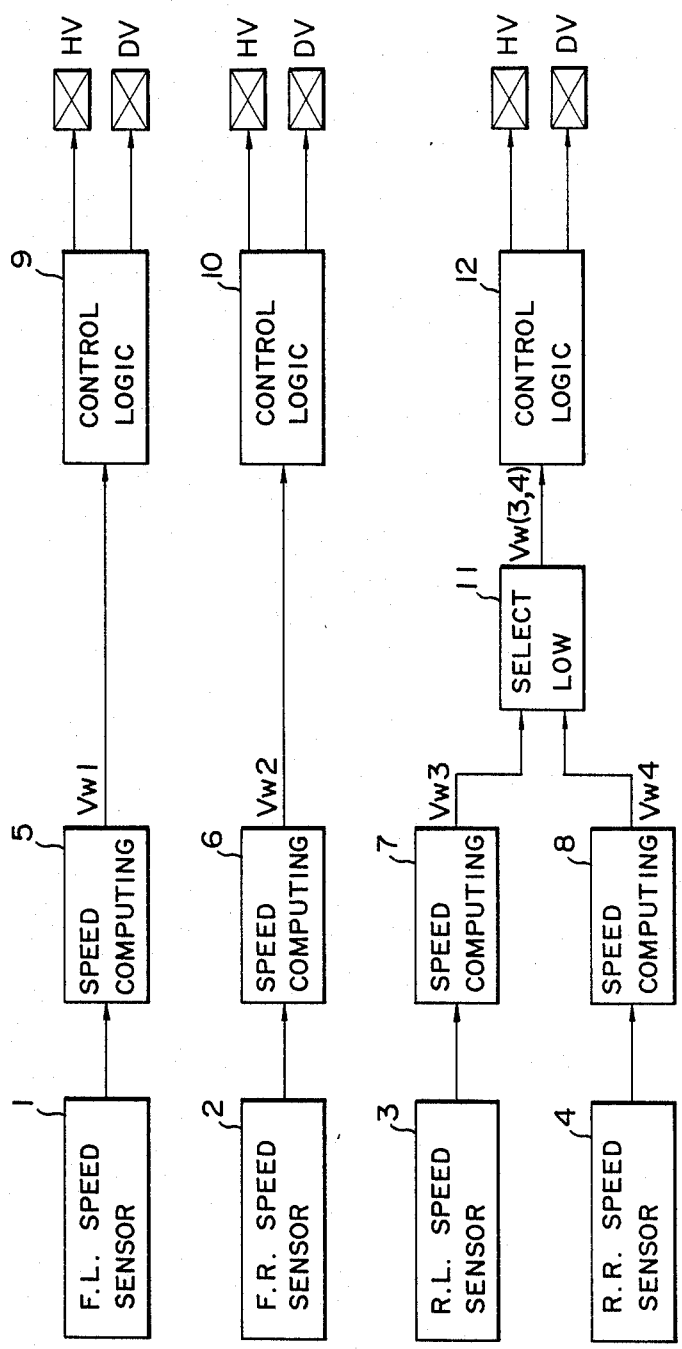
FIG. 2 is a block diagram showing the anti-skid control system according to an embodiment of the present invention.

Referring to FIG. 2, there is shown, in a block diagram, the anti-skid control system according to an embodiment of the present invention, which includes a front lefthand wheel speed sensor 1, front righthand wheel speed sensor 2, rear lefthand wheel speed sensor 3, and rear righthand wheel speed sensor 4. Signals derived from the wheel speed sensors 1 to 4 are passed to speed computing circuits 5 to 8 respectively which in turn provide respective wheel speeds $V_{w1}$ to $V_{w4}$. The front righthand and lefthand wheel speeds $V_{w1}$ and $V_{w2}$ are inputted to logic circuits 9 and 10 respectively, while the rear righthand and lefthand wheel speeds $V_{w3}$ and $V_{w4}$ are inputted to a selector circuit 11 so that the lower one of the two wheel speeds is selected (referred to as "select low" just for the sake of convenience hereinafter), and the thus selected wheel speed, which is indicated by $V_w$ (3.4) is inputted to a control logic circuit 12. In this way, hold valve HV and decay valves DV are controlled by means of the aforementioned three control logic circuits 9, 10 and 12 (three-channel type control).

Figure 3:
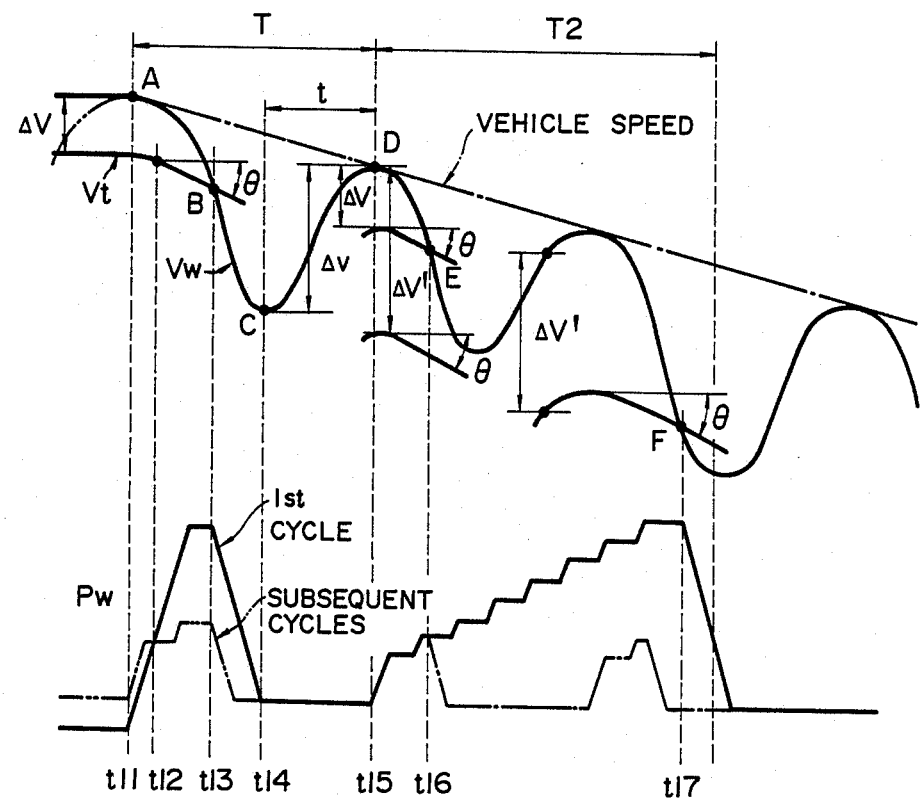
FIG. 3 is a view useful for explaining the operation of the anti-skid control system shown in FIG. 2.

FIG. 3 shows the relationship between the wheel speed $V_w$ and the brake hydraulic pressure $P_w$ which occurs when the motor vehicle is running on a rough road.

In FIG. 3, on the assumption that the point A on a control cycle curve representing the wheel speed $V_w$ is the time t11 when the brake equipment was operated in the first control cycle or when a high peak of the wheel speed occurred in the second or subsequent control cycle, the wheel speed $V_w$ will be decreased as the brake hydraulic pressure $P_w$ builds up from the time t11, and the reference wheel speed $V_t$ will be lower by a predetermined amount $\Delta V$ than and follow the wheel speed $V_w$ with such speed difference. The reference wheel speed $V_t$ will be caused to linearly decrease with a deceleration gradient of $-1G$ from time t12 when the deceleration $-\dot{V}_w$ of the wheel speed $V_w$ has reached the value of $-1G$, and reduction of the brake hydraulic pressure $P_w$ will be started from a point B when the wheel speed $V_w$ and reference wheel speed $V_t$ have become equal to each other, i.e., from time t13. In FIG. 3, changes in the brake hydraulic pressure $P_w$ which occur in the first control cycle are represented by solid lines, and changes in the brake hydraulic pressure $P_w$ which occur in the second and subsequent control cycles, are indicated by alternate long and two short dashes lines. The reduction of the brake hydraulic pressure $P_w$ which was started at the time t13, will be continued until time t14 whena low peak point C of the wheel speed $V_w$ occurs, and from the time t14 onward, the brake hydraulic pressure $P_w$ will be held. Because of the brake hydraulic pressure $P_w$ being held, the wheel speed will be changed from deceleration to acceleration, and the next high peak D thereof will occur at time t15, so that build up of the brake hydraulic pressure $P_w$ will be started. The time period T between A and D, i.e., between the points of time t11 and t15 will now be measured, and it will be compared with a predetermined time period T1. The time period t between C and D, i.e., between the points of time t14 and t15 will also be measured, and it will be compared with a predetermined time period t1. Furthermore, the difference $\Delta v$ between the wheel speed $V_L$ at the low peak point C and the wheel speed $V_H$ at the high peak D will be measured, and such speed difference $\Delta v$ will be compared with a predetermined speed difference $\Delta v_1$. In case it is detected that the time period T is shorter than the time period T1, that the time period t is shorter than the time period t1 and that the speed difference $\Delta v$ is greater than the speed difference $\Delta v_1$, i. e., in case where it is detected that the control cycle has become faster than that when the motor vehicle is running on a normal road and that the amplitude of the wheel speed $V_w$ has become greater than that when the motor vehicle is running on a normal road, it will be judged, on the basis of the results of such detections, that the motor vehicle is running on a rough road, and consequently the aforementioned speed difference $\Delta V$ between the wheel speed $V_w$ and the reference wheel speed $V_t$ will be changed to a larger quantity $\Delta V'$. In the case where the speed difference $\Delta V$ has been set at 3 km/hour, for example, then the quantity $\Delta V'$ will be set at a value that is three times as high as the speed difference $\Delta V$, i.e., at 9 km/hour. It is to be understood that the present invention is characterized, among other things, by the feature that the speed difference $\Delta V$ will be changed to a greater quantity $\Delta V'$ when the preset conditions are satisfied. It such change were not effected, then reduction of the brake hydraulic pressure $P_w$ would be started at a point E, i.e., at time t16 in FIG. 3 so that the brake hydraulic pressure $P_w$ would be reduced as shown by alternate long short dash lines; by changing $\Delta V$ to $\Delta V'$, however, the reference wheel speed $V_t$ will be shifted downwardly so that the line representing the deceleration gradient of −1G thereof will not cross the curve representing the wheel speed Vw, thus preventing reduction of the brake hydraulic pressure from being started. In this way, buildup and holding of the brake hydraulic pressure Pw will be alternately effected in succession, so that the brake hydraulic pressure Pw will be increased gradually. That is, the buildup of the brake hydraulic pressure Pw will be produced intermittently. It is at a point F, i.e., at time t17 when the wheel speed Vw drops deeply that reduction of the brake hydraulic pressure Pw will be started.

The time period during which the speed difference ΔV has been changed to ΔV', is preset to be T2; and if the time period T2 elapses before a point of time when reduction of the brake hydraulic pressure Pw is to be started, is reached, then the aforementioned speed difference will be returned from ΔV' to ΔV.

Figure 4:
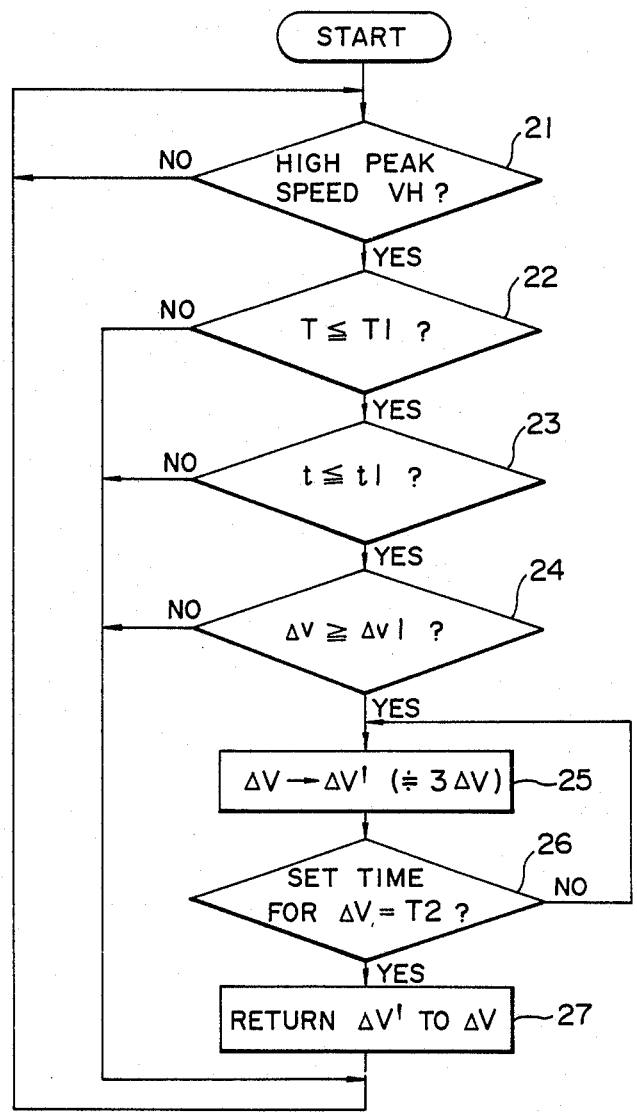
FIG. 4 is a flow chart useful for explaining the operation of the system of FIG. 2.

FIG. 4 is a flow chart showing how controls are executed in the respective control logic circuits 9, 10 and 12 when the above-mentioned speed difference is changed from ΔV to ΔV'. At step 21, judgment is made as to whether or not the current wheel speed Vw is high peak speed VH, and if the result of the judgment is "YES", then at the nest step 22, judgment is made as to whether or not the time period T from the high peak point A of the wheel speed Vw (or the time point when the braking operation is to be started) to the next high peak point D, is shorter than the preset time period T1. If the result of the last-mentioned judgment is "YES", then at subsequent step 23, judgment is made as to whether or not the time period t from the low peak point C to the high peak point D is shorter than the preset time period t1; and if the result of this judgment is "YES", then at the next step 24, judgment is made as to whether or not the difference Δv between the wheel speed VL at the low peak point C and the wheel speed Vh at the high peak point D greater than the preset speed difference Δv1. If the result of the judgment made at the step 24 is "YES", then the aforementioned speed difference ΔV between the wheel speed Vw and the reference wheel speed Vt is changed to ΔV' (ΔV'=3 ΔV). Subsequently, at step 26, judgment is made as to whether the time period during which the speed difference ΔV' occurs, becomes equal to the predetermined time period T2, and if the result of this judgment is "YES", the quantity ΔV' is returned to ΔV.

Although in FIG. 2, there is shown a so-called three-channel control system which includes the three control logic units, it will be readily appreciated that this application is also equally applicable a two-channel control system.

As will be appreciated from the foregoing discussion, according to the present invention, control is performed such that when the motor vehicle is running on a bad or rough road, judgment is made as to whether or not the aforementioned three conditions have been fulfilled, and if the result of the judgment is positive, then it is judged that the road on which the motor vehicle is now running is a rough road, as a result of which the difference ΔV between the wheel speed Vw and the reference wheel speed Vt is changed to the quantity ΔV' which may be three times as great as ΔV, for example.

In this way, according to the present invention, it is possible to achieve highly accurate judgment as to whether the road on which the motor vehicle is running is a rough one, thereby preventing reduction of the brake hydraulic pressure from being started early, and thus preventing the braking distance from being increased.

While the present invention has been illustrated explained with respect to specific embodiments thereof, it is to be understood that the invention is by no means limited thereto but encompasses all changes modifications which will become possible within the scope of the appended claims.

We claim:

1. An anti-skid control system for motor vehicles, wherein a reference wheel speed is set up which is lower by a predetermined amount than wheel speed decelerated through buildup of brake hydraulic pressure and follows the wheel speed with a first speed difference corresponding to said predetermined amount, said reference wheel speed being decelerated, from a point of time when the deceleration of said wheel speed reaches a predetermined deceleration level onward, with a predetermined deceleration gradient to hold said predetermined deceleration level; and at a point of time when said reference wheel speed becomes equal to said wheel speed, reduction of the brake hydraulic pressure is started so that said wheel speed is changed from deceleration to acceleration, comprising:
    a first means for measuring a first time period which is the time period from a first point of time when a first high peak of the wheel speed occurs to a second point of time when a subsequent high peak of the wheel speed occurs;
    a second means for measuring a second time period which is the time period from a third point of time when low peak of the wheel speed occurs within said first time period to said second point of time when said subsequent high peak of the wheel speed occurs;
    a third means for measuring a second speed difference which is the difference between the wheel speed at said second point of time and the wheel speed at said third point of time;
    a fourth means for making judgment as to whether said first and second time periods occur within a first and a second preset time period respectively;
    a fifth means for making judgment as to whether said second speed difference is greater than a preset speed difference; and
    a sixth means adapted, when the results of said judgments are positive; to change said first speed difference to a greater preset speed difference, thereby preventing reduction of the brake hydraulic pressure from being started early.

2. The system according to claim 1, wherein said greater preset speed difference is three times as great as said first speed difference.

3. The system according to claim 3, wherein said first speed difference is set to 3 km/hour.

* * * * *